United States Patent
Berne

(10) Patent No.: US 12,269,438 B2
(45) Date of Patent: Apr. 8, 2025

(54) SENSOR CLEANING SYSTEM FOR A VEHICLE AND A METHOD FOR CLEANING A SENSOR

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 161 days.

(21) Appl. No.: 17/795,443

(22) PCT Filed: Feb. 6, 2020

(86) PCT No.: PCT/EP2020/052988
§ 371 (c)(1),
(2) Date: Jul. 26, 2022

(87) PCT Pub. No.: WO2021/155931
PCT Pub. Date: Aug. 12, 2021

(65) Prior Publication Data
US 2023/0060169 A1    Mar. 2, 2023

(51) Int. Cl.
*B60S 1/52*    (2006.01)
*B60S 1/48*    (2006.01)
(Continued)

(52) U.S. Cl.
CPC ............... *B60S 1/52* (2013.01); *B60S 1/481* (2013.01); *B60S 1/50* (2013.01); *B60S 1/54* (2013.01)

(58) Field of Classification Search
None
See application file for complete search history.

(56) References Cited

U.S. PATENT DOCUMENTS

2003/0047621 A1*  3/2003  Fukushima ............. B60S 1/481
                                                          239/284.1
2011/0155192 A1*  6/2011  Ahmad ..................... B60S 1/68
                                                          134/56 R
(Continued)

FOREIGN PATENT DOCUMENTS

DE    102018115011 A1    12/2018
EP       3168094 A1      5/2017
(Continued)

OTHER PUBLICATIONS

International Search Report and Written Opinion for International Patent Application No. PCT/EP2020/052988, mailed Oct. 12, 2020, 12 pages.

*Primary Examiner* — Omair Chaudhri
(74) *Attorney, Agent, or Firm* — Withrow & Terranova, PLLC

(57) ABSTRACT

A cleaning system for a sensor to be cleaned, comprising an accumulator comprising at least one cleaning fluid compartment provided with at least one tensioning element; a cleaning fluid inlet for receiving cleaning fluid; a cleaning fluid outlet for providing cleaning fluid in the form of a cleaning fluid jet; at least one gas compartment provided with at least one tensioning element; a gas inlet for receiving gas; and a gas outlet for providing gas in the form of a gas jet, a cleaning fluid electrovalve for controlling flow of cleaning fluid applied to the sensor to be cleaned, and a gas electrovalve for controlling flow of gas applied to the sensor to be cleaned.

15 Claims, 2 Drawing Sheets

(51) Int. Cl.
*B60S 1/50* (2006.01)
*B60S 1/54* (2006.01)

(56) References Cited

U.S. PATENT DOCUMENTS

| | | | |
|---|---|---|---|
| 2014/0217194 A1* | 8/2014 | Han | B60S 1/56 |
| | | | 239/284.1 |
| 2017/0182980 A1* | 6/2017 | Davies | B05B 9/04 |
| 2018/0015908 A1* | 1/2018 | Rice | B60S 1/56 |
| 2018/0201231 A1* | 7/2018 | Tani | G02B 27/0006 |
| 2018/0290632 A1* | 10/2018 | Rice | B60S 1/56 |
| 2019/0106086 A1* | 4/2019 | Giraud | B60S 1/0848 |
| 2020/0001832 A1* | 1/2020 | Deane | B08B 3/02 |
| 2021/0001678 A1* | 1/2021 | Koyama | B60S 1/54 |
| 2021/0078544 A1* | 3/2021 | Kimura | B60S 1/528 |

FOREIGN PATENT DOCUMENTS

| | | | |
|---|---|---|---|
| FR | 2585311 A1 * | 1/1987 | |
| KR | 20170137359 A * | 12/2017 | |
| WO | 2018187089 A1 | 10/2018 | |
| WO | 2019012882 A1 | 1/2019 | |

* cited by examiner

SENSOR CLEANING SYSTEM FOR A VEHICLE AND A METHOD FOR CLEANING A SENSOR

This application is a 35 USC 371 national phase filing of International Application No. PCT/EP2020/052988, filed Feb. 6, 2020, the disclosure of which is incorporated herein by reference in its entirety.

TECHNICAL FIELD

The invention relates to a sensor cleaning system for a vehicle. The invention further relates to a method for cleaning a sensor thanks to this cleaning system.

The invention can be applied in vehicles including heavy-duty vehicles, such as trucks, buses and construction equipment, in particular in automated vehicles. Although the invention will be described with respect to an automated vehicle, the invention is not restricted to this particular vehicle, but may also be used in other vehicles including sensors.

BACKGROUND

The invention is directed to a vehicle including a sensor such as a light detection and ranging (LIDAR), a camera, a RADAR, a SONAR, an infrared system . . . .

Vehicles, in particular autonomous vehicles, require sensors in order to capture data of a surrounding vehicle environment.

Depending on the driving environment or/and weather conditions, sensors may become soiled and therefore may capture partial or incorrect data. This may lead to reduced safety outcome.

In case a sensor is detected as soiled and therefore non-operational, the vehicle may need to switch to a safe mode which may include for instance coming to a halt and/or activating hazard lights.

It is therefore desirable to avoid or limit the switching into a vehicle safe mode caused by a soiled sensor which is an unavoidable occurrence for any vehicle.

While systems for cleaning sensors exist, they are not fully satisfactory. Indeed, they generally comprise a fluid tank kept under constant pressure to supply cleaning fluid through nozzles to a sensor, which needs cleaning. The fluid tank kept under constant pressure requires storing energy as pressure in the tank. This is not desirable as there is an intrinsic risk of leakage with pressurized tank and maintaining a tank under pressure tends to use some vehicle power.

SUMMARY

An object of the invention is to provide a very reactive system for cleaning a sensor, that solve at least the previous problem of the prior art.

To that end, according to a first aspect of the invention, the invention relates to a cleaning system for cleaning a vehicle sensor, comprising:
an accumulator comprising:
at least one cleaning fluid compartment provided with:
at least one tensioning element,
a cleaning fluid inlet for receiving cleaning fluid, and
a cleaning fluid outlet for providing cleaning fluid in the form of a cleaning fluid jet,
at least one gas compartment provided with:
at least one tensioning element,
a gas inlet for receiving gas, and
a gas outlet for providing gas in the form of a gas jet,
a cleaning fluid spray device configured to spray cleaning fluid on the vehicle sensor,
a gas spray device configured to spray gas on the vehicle sensor.

By the provision of an accumulator comprising a cleaning fluid compartment and a gas compartment with tensioning elements, the cleaning device avoids having a cleaning fluid tank kept under constant pressure, and therefore avoids the risks of leakage of fluid.

Moreover, the cleaning system will require less power, as no pump need to work all times to spray cleaning fluid to a sensor to be cleaned.

In addition, the cleaning fluid and gas pressure applied to the sensor to be cleaned can be adapted thanks to the accumulator, for instance by managing the opening of the cleaning fluid outlet and/or the gas outlet.

Besides, the accumulator is easily rechargeable via the cleaning fluid inlet and the gas inlet. Therefore, the cleaning system can be assigned to sensors of a vehicle, which are located at different areas of the vehicle.

Furthermore, thanks to its compact size, the accumulator of the cleaning system can be placed nearby a sensor to be cleaned in order to have a very reactive cleaning system.

According to one embodiment, the cleaning system comprises:
an outlet cleaning fluid valve for controlling flow of cleaning fluid applied to the vehicle sensor, and
an outlet gas valve for controlling flow of gas applied to the vehicle sensor.

The tensioning elements are arranged to be operated when the valves are opened to spray cleaning fluid and gas from the accumulator to the sensor to be cleaned.

According to one embodiment, the cleaning system comprises a control unit connected to the outlet cleaning fluid valve and the outlet gas valve. The control unit is configured to operate the valves in order to supply cleaning fluid and gas to the sensor to be cleaned.

The outlet valves are preferably electrovalves.

According to a further embodiment, the cleaning system further comprises:
a cleaning fluid tank, and
a gas tank.

According to one embodiment, the gas tank is a pressurized tank.

According to this embodiment, the cleaning system further comprises an inlet gas valve between the gas tank and the accumulator, for controlling the flow of gas supplied to the accumulator.

The inlet gas valve is advantageously connected to the control unit. Therefore, the control unit is configured to operate the inlet gas valve in order to control the flow of gas supplied to the accumulator.

The inlet gas valve is preferably an electrovalve.

According to another embodiment, the gas tank is not a pressurized tank and the cleaning system comprises a gas pump arranged in communication with the gas tank and the gas inlet of the accumulator.

The gas pump allows to refill the accumulator with gas. As the gas is not pressurized in the accumulator, this pump is with low flow capacity. Therefore, this pump does not involve many costs.

The gas pump is advantageously connected to the control unit. Therefore, the control unit is configured to operate the gas pump in order to supply gas to the accumulator.

According to one embodiment, the cleaning fluid tank is a pressurized tank.

According to this embodiment, the cleaning system further comprises an inlet cleaning fluid valve between the cleaning fluid tank and the accumulator, for controlling the flow of cleaning fluid supplied to the accumulator.

The inlet cleaning fluid valve is advantageously connected to the control unit. Therefore, the control unit is configured to operate the inlet cleaning fluid valve in order to control the flow of cleaning fluid supplied to the accumulator.

The inlet cleaning fluid valve is preferably an electrovalve.

According to another embodiment, the cleaning fluid tank is not a pressurized tank and the cleaning system comprises a cleaning fluid pump arranged in communication with the cleaning fluid tank and the cleaning fluid inlet of the accumulator.

The cleaning fluid pump allows to refill the accumulator with cleaning fluid. As the cleaning fluid is not pressurized in the accumulator, this pump is with low flow capacity. Therefore, this pump do not involve many costs.

The cleaning fluid pump is advantageously connected to the control unit. Therefore, the control unit is configured to operate the cleaning fluid pump in order to supply cleaning fluid to the accumulator.

In addition, the cleaning system can comprise level sensors arranged to provide a signal representing the level of cleaning fluid and gas in the accumulator. In this way, the accumulator can be refilled when needed.

The level sensors are advantageously connected to the control unit. Therefore, the control unit is configured to receive the signal and to operate the pumps and/or inlet valves based on the signal. The control unit is configured such that a signal indicating a level below a predetermined value operates the cleaning fluid pump or inlet cleaning fluid valve, and/or the gas pump or inlet gas valve to supply cleaning fluid and/or gas from the cleaning fluid container and/or the gas container to the accumulator and increase the level of cleaning fluid and/or gas in the accumulator.

In an embodiment, the cleaning system comprises a soil sensor arranged to provide a signal when the sensor to be cleaned is soiled.

According to this embodiment, the control unit is also connected to the soil sensor for measuring when the sensor to be cleaned is soiled. Therefore, the control unit is configured to operate the outlet valves based on the signal. The control unit is configured such that when a signal indicates that a sensor is soiled, the control unit operates the outlet cleaning fluid valve and/or the outlet gas valve to supply cleaning fluid and/or gas to the sensor to be cleaned.

The control unit is preferably an electronic control unit (ECU).

The tensioning elements are for example springs with membrane.

The cleaning fluid can be water.

The gas can be air.

According to one embodiment, the cleaning fluid compartment is concentrically arranged around the gas compartment. This arrangement proves to be advantageous as it makes the accumulator very compact.

According to a second aspect of the invention, these and other objectives are achieved by a method for cleaning a vehicle sensor using a cleaning system previously described, the method comprising:
measuring the level of cleaning fluid and gas in the cleaning fluid and gas compartments of the accumulator;
filling the cleaning fluid and gas compartments of the accumulator respectively with cleaning fluid and gas to store energy in the accumulator,
spraying the cleaning fluid and the gas in order to supply cleaning fluid and gas on the vehicle sensor.

By the provision of a method which comprises a step of filling the cleaning fluid and gas compartment of the accumulator respectively with cleaning fluid and gas, energy is stored in the accumulator without having a constant pressure in the cleaning fluid and gas compartments. Therefore, a sensor can be cleaned without risk of leakage of fluid.

According to a third aspect of the invention, these and other objectives are achieved by a vehicle comprising a vehicle sensor associated with a cleaning system previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3 and 4 are schematic views of trucks with cleaning system associated to a vehicle sensor;

DETAILED DESCRIPTION OF EXAMPLE EMBODIMENTS OF THE INVENTION

Figure 1:
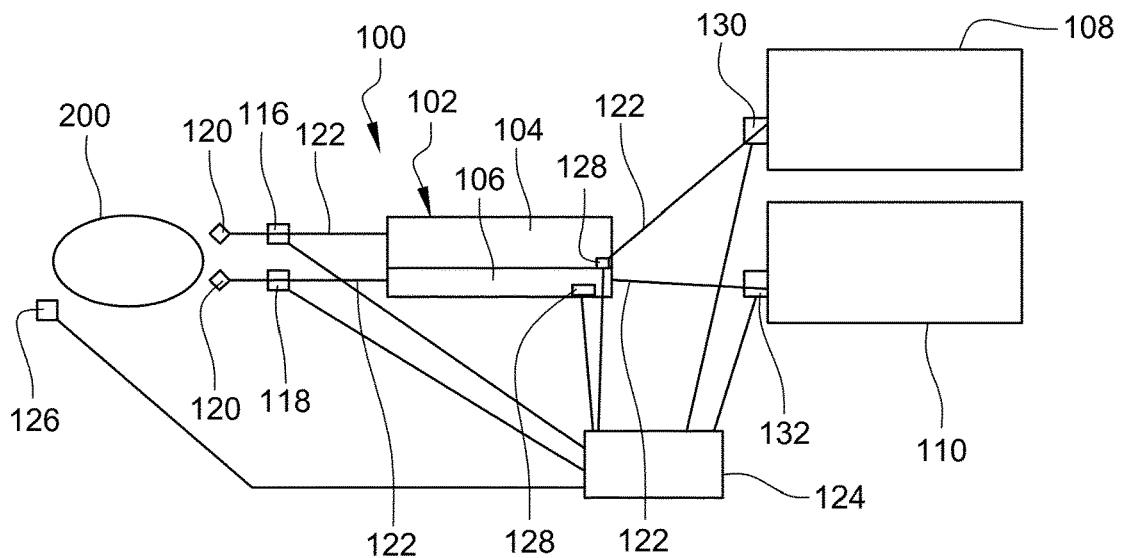
FIG. 1 is a schematic view of a cleaning system according to the invention.

FIG. 1 shows a cleaning system 100 intended to clean a vehicle sensor 200 such as a light detection and ranging (Lidar) sensor.

The cleaning system 100 comprises an accumulator 102 arranged for storing water and air that will be used for cleaning the sensor 200. In particular, the accumulator 102 comprises a water compartment 104 and an air compartment 106. The accumulator 102 will be more specifically described with regards to FIGS. 2 and 3.

Moreover, the cleaning system 100 comprises an outlet water electrovalve 116 and an outlet air electrovalve 118, for controlling the flow of water and air applied to the sensor 200. The outlet water electrovalve 116 is arranged in fluid communication with the water compartment 104 of the accumulator 102 and the outlet air electrovalve 118 is arranged in air communication with the air compartment 106 of the accumulator 102.

Water and air are applied to the sensor 200 via spray devices 120, 120' which are respectively in fluid communication with the outlet water electrovalve 116 and in air communication with the outlet air electrovalve 118.

As shown in FIG. 1, the cleaning system 100 comprises a water tank 108 and an air tank 110. In the example of FIG. 1, the water tank 108 and the air tank 110 are pressurized. In this example, the cleaning system 100 comprises an inlet water valve 130 positioned between the water tank 108 and the water compartment 104 of the accumulator 102. Furthermore, the cleaning system 100 comprises an inlet air valve 132 positioned between the air tank 110 and the air compartment 106 of the accumulator 102.

The inlet water valve 130 enables to control the flow of water supplied to the accumulator 102. The inlet air valve 132 enables to control the flow of air supplied to the accumulator 102.

In the cleaning system, the fluid and air communications are preferably effected through pipes 122.

A control unit 124 such as an electronic control unit (ECU) enables to control the supplying of water and air to the sensor 200 from the accumulator 102 To this end, the control unit 124 is connected to a soil sensor 126 arranged to provide a signal to the control unit 124, when the sensor 200 is soiled, and the control unit 124 is connected to the outlet water electrovalve 116 and the outlet air electrovalve 118, in order to operate the electrovalves 116, 118 to supply water and air to the sensor 200 when the signal is received by the control unit 124.

The water compartment 104 and the air compartment 106 comprise a sensor 128 arranged to provide a signal representing the level of water and air in the accumulator.

The control unit 124 enables to control the supplying of water and air to the accumulator 102. To this end, the control unit 124 is connected to the level sensors 128 positioned in the accumulator. Moreover, in the example of FIG. 1, where the water and air tanks are pressurized, the inlet water valve 130 and the inlet air valve 132 are connected to the control unit 124. In this way, the control unit 124 operates the inlet water valve 130 and the inlet air valve 132 when a signal is received from the level sensors 128.

In an example not represented the water tank 108 is arranged in fluid communication with a water pump 112, which is arranged in fluid communication with the water compartment 104 of the accumulator 102 and/or the air tank 110 is arranged in air communication with an air pump 114, which is arranged in air communication with the air compartment 106 of the accumulator 102.

In this example, the control unit 124 is connected to the water pump 112 and the air pump 114, in order to operate the pumps 112, 114 to refill the accumulator 102 when the signal is received by the control unit 124. More particularly, the control unit 124 is connected to two level sensors 128, one in the water compartment 104 and one in the air compartment.

Figure 2:
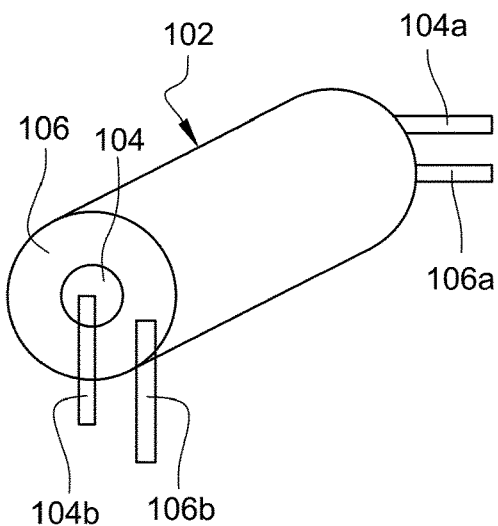
FIG. 2 is a schematic perspective view of an accumulator of the cleaning system of FIG. 1.
Figure 3:
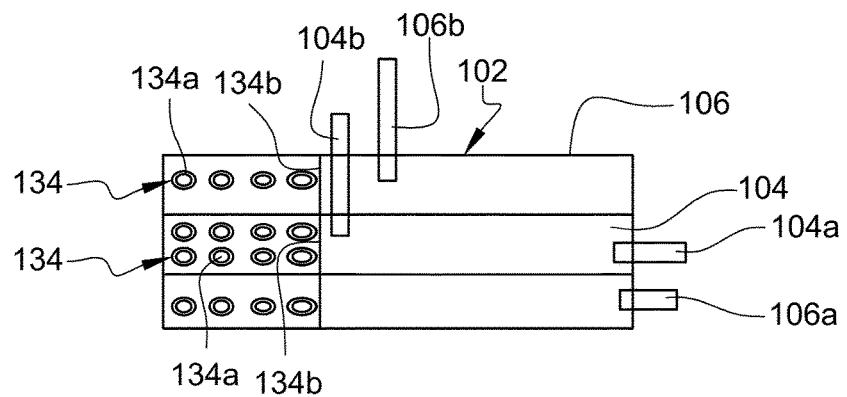
FIG. 3 is a schematic longitudinal cross-sectional view of the accumulator of FIG. 2.

As illustrated in FIGS. 2 and 3, the accumulator 102 is cylindrical and the water compartment 104 can be concentrically arranged around the air compartment 106. This arrangement proves to be advantageous as it makes the accumulator very compact. The water compartment 104, comprises a water inlet 104a which is in fluidic communication through pipes 122 with the water tank 108 (FIG. 1). Furthermore, the water compartment 104 comprises a water outlet 104b from where the water may exit to be able to spray upon the sensor 200 (FIG. 1). Similarly, the air compartment 106, comprises an air inlet 106a which is in air communication through pipes 122 with the air tank 110 (FIG. 1), and the air compartment 106 comprises an air outlet 106b from where the air may exit to be able to spray upon the sensor 200 (FIG. 1).

As illustrated in FIG. 3, the accumulator 102 comprises tensioning elements 134 in the water compartment 104 and in the air compartment 106. In the embodiment of the invention the tensioning elements 134 are of the mechanical type and are spring loaded. Each tensioning element 134 is comprised of, for example, a spring 134a with a membrane 134b. The tensioning elements 134 are arranged to mechanically store energy in order to supply energy to release water and/or air to the spray devices when the outlet water electrovalve 116 and/or the outlet air electrovalve 118 are operated by the control unit 124.

Figure 4:
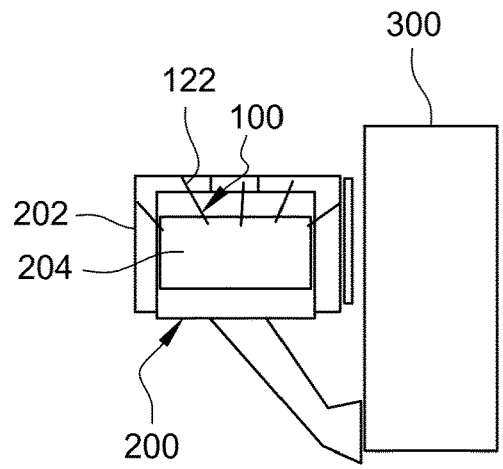
Figure 5:
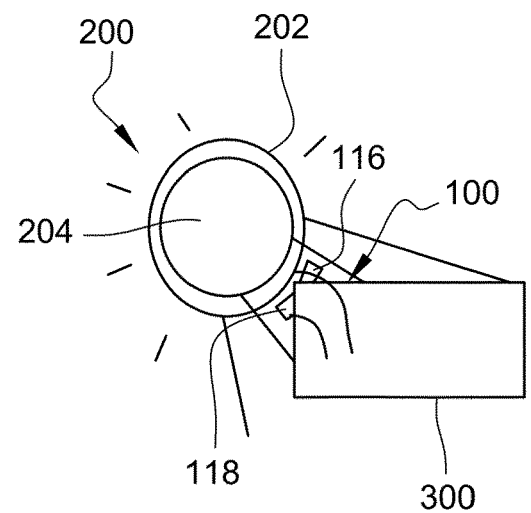
FIG. 5 is a view of a cleaning system associated to a vehicle sensor mounted on a truck.
Figure 6:
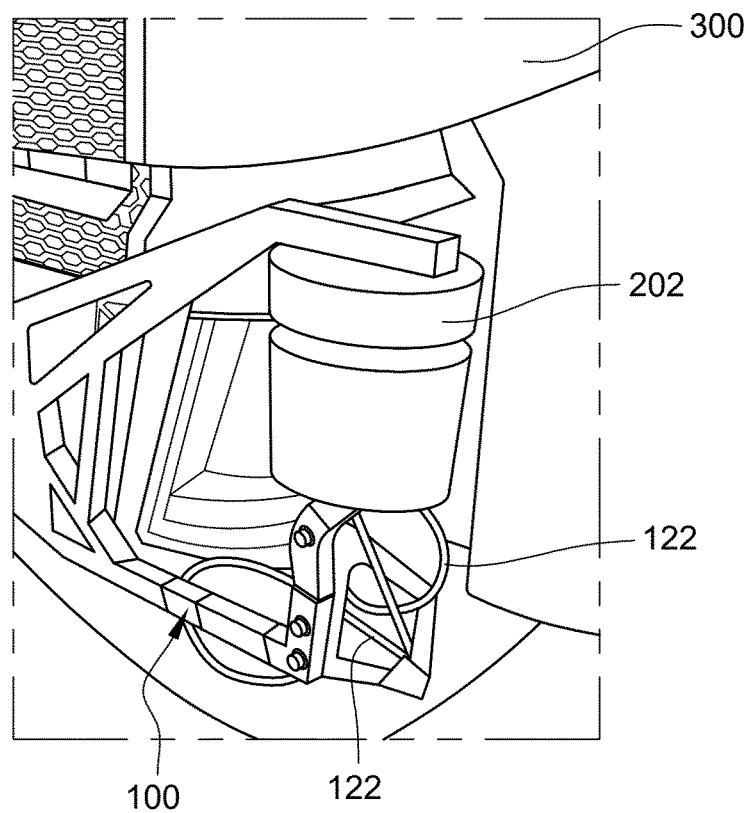

FIGS. 4 to 6 illustrates a truck 300 with a vehicle sensor 200 and a cleaning system 100 to clean the vehicle sensor 200.

The sensor 200 can be a Lidar sensor comprising a shell 202 and a screen 204. As illustrated previously, the cleaning system 100 comprises an accumulator 102 with a water compartment 104 and an air compartment 106 (FIGS. 1 to 3) which are connected to spray devices (FIG. 1) via pipes 122, in order to spray water and/or air to the sensor 200 when outlet water electrovalve 116 and/or outlet air electrovalve 118 are operated by a control unit (FIG. 1).

The sensor 200 represented in FIGS. 4 to 6 is a Lidar sensor disposed on a corner of the truck 300.

It is to be understood that the present invention is not limited to the embodiments described above and illustrated in the drawings; rather, the skilled person will recognize that many changes and modifications may be made within the scope of the appended claims.

The invention claimed is:

1. A cleaning system for cleaning a vehicle sensor, comprising:
   an accumulator comprising:
      at least one cleaning fluid compartment provided with:
         a plurality of tensioning elements,
         a cleaning fluid inlet for receiving cleaning fluid, and
         a cleaning fluid outlet for providing cleaning fluid in the form of a cleaning fluid jet, and
      at least one gas compartment provided with:
         a plurality of tensioning elements,
         a gas inlet for receiving gas, and
         a gas outlet for providing gas in the form of a gas jet,
   a cleaning fluid spray device configured to spray cleaning fluid on the vehicle sensor, and
   a gas spray device configured to spray gas on the vehicle sensor.

2. The cleaning system of claim 1, further comprising:
   an outlet cleaning fluid valve for controlling flow of cleaning fluid applied to the vehicle sensor, and
   an outlet gas valve for controlling flow of gas applied to the vehicle sensor, wherein the outlet cleaning valve and the outlet gas valve are electrovalves.

3. The cleaning system of claim 2, further comprising a control unit connected to the outlet cleaning fluid valve and the outlet gas valve.

4. The cleaning system of claim 3, further comprising:
   a cleaning fluid tank,
   a gas tank,
   a cleaning fluid pump connected to the cleaning fluid tank and the cleaning fluid inlet of the accumulator, and
   a gas pump connected to the gas tank and the gas inlet of the accumulator.

5. The cleaning system of claim 4, wherein the cleaning fluid pump and the gas pump are connected to the control unit.

6. The cleaning system of claim 3, further comprising level sensors arranged to provide a signal representing a level of cleaning fluid and a level of gas in the accumulator.

7. The cleaning system of claim 6, wherein the level sensors are connected to the control unit.

8. The cleaning system of claim 4, further comprising:
   an inlet cleaning fluid valve between the cleaning fluid tank and the cleaning fluid pump, for controlling the flow of cleaning fluid through the cleaning fluid pump, and an inlet gas valve between the gas tank and the gas pump, for controlling the flow of gas through the gas pump, wherein the inlet cleaning valve and the inlet gas valve are electrovalves.

9. The cleaning system of claim 8, wherein the inlet cleaning fluid valve and the inlet gas valve are connected to the control unit.

10. The cleaning system of claim 9, further comprising a soil sensor arranged to provide an alert when the vehicle sensor is soiled.

11. The cleaning system of claim 10, wherein the control unit is also connected to the soil sensor for measuring when the vehicle sensor is soiled.

12. The cleaning system of claim 3, wherein the control unit is an electronic control unit (ECU).

13. The cleaning system of claim 1, wherein the tensioning elements are springs with a membrane.

14. The cleaning system of claim 1, wherein the at least one cleaning fluid compartment is concentrically arranged around the at least one gas compartment.

15. A vehicle comprising a vehicle sensor associated with the cleaning system of claim 1.

* * * * *